Sept. 17, 1963   W. K. GULICK   3,103,950
FLOW LIMITING VALVE
Filed Sept. 19, 1960
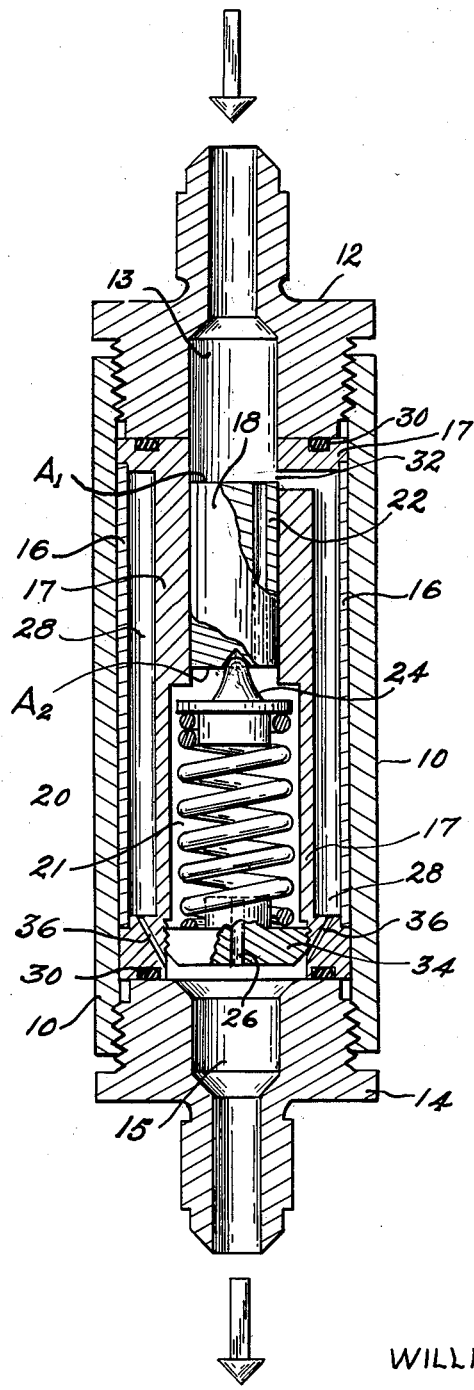
INVENTOR.
WILLIAM K. GULICK
BY
ATTORNEYS 3,103,950
FLOW LIMITING VALVE
William K. Gulick, Glendale, Ohio, assignor to the United States of America as represented by the Secretary of the Air Force
Filed Sept. 19, 1960, Ser. No. 57,083
2 Claims. (Cl. 137—494)

This invention relates to flow limiting valves or more particularly to a valve for maintaining a constant flow of fluid under widely varying conditions of temperature and viscosity.

It is desirable, and frequently necessary, to supply a constant flow of fluid whether it be gas or liquid. In the case of an airplane the fluid supply for a hydraulic system may be subjected to temperatures of −65° F. to 350° F. which greatly affects the viscosity of the fluid. Unless means is provided to assure an even flow of fluid the hydraulic system will receive too little flow when the supply is cold or too much when the supply is hot.

There is no known device which will automatically maintain a constant flow of fluid in such a system when subjected to such extremes of temperature or viscosity. A device or system is indicated, therefore, which is sensitive to viscosity and which will operate reliably and automatically in fluids subject to such extremes. Several possible solutions to the problem suggest themselves, such as the use of motors actuated by thermocouples or temperature sensitive devices, such as springs, bimetallic mechanisms, contained gases or fluids. All of these approaches appear unsatisfactory as being complex, heavy, unreliable, expensive and limited as to range.

It is an object of this invention, therefore, to provide a simple, reliable device for maintaining a constant flow of fluid regardless of its viscosity.

It is a further object to devise such a device which is inexpensive, light in weight and easily attached in the line to be regulated.

It is a still further object to furnish a viscosity sensitive device which will regulate the flow of a fluid through it at a constant level under extreme variations of temperature and viscosity of the fluid.

The above objects are met by the present invention which consists essentially of a cylinder interposed in the line to be regulated which employs a capillary tube as defined by Poiseuille's law, an orifice as defined by Bernoulli's law (both in compliance with Reynolds criterion) which determine the position of a piston biased by a spring to regulate the flow of fluid around said piston and through said orifice according to the viscosity of the fluid.

The above and still other objects, advantages and features of my invention will become apparent upon consideration of the following detailed description of one embodiment thereof, especially when taken in conjunction with the accompanying drawing, in which the figure is a sectional view showing the essential parts of the valve assembly.

In the drawing 10 represents a cylindrical shell, or housing, in which is fitted a cylinder lining 16. A cylinder 17, bored in its upper portion to house a piston 18, and connected with an inlet 13, is held in the said housing 10 by an entrance fitting 12 and an exit fitting 14 threaded to screw into the ends of said housing. Oil rings 30 are provided to prevent the escape of fluids. A passage 28 between the outer surface of cylinder 17 and the inner surface of cylinder lining 16 connects entrance port 13 with an exit port 15 through a metering orifice 32. The lower end of cylinder 17 is counter bored to form a chamber 21 housing a spring 20 held in position by a threaded plug 34 and a spring guide 24 which abuts against piston 18. Plug 34 is bored to provide a capillary entrance 26 to chamber 21 from the exit port 15 and is threaded into cylinder 17 to serve as a stop and adjustment for the pressure of spring 20. At the bottom of cylinder 17 is an exit orifice 36 which serves to connect passage 28 with exit port 15. Through the piston 18 is a capillary bore 22 which connects the upper face of piston 18, designated $A_1$, to the lower face of said piston, and designated $A_2$. Capillary 22 is designed to pass no flow, or very little flow, at extreme high viscosity conditions of the fluid and permits increasing flow with decreasing viscosity.

In operation assume a constant pressure of a fluid in entrance port 13 at a temperature of −65° F. At this temperature the fluid is at extreme viscosity.

Piston 18, which is cylindrical in shape having equal areas at $A_1$ and $A_2$, is fully displaced in the direction of the arrow, thereby compressing spring 20 when fluid pressure is applied to entrance port 13. The capillary 22, through the piston 18, is designed such that there exists no fluid flow, or very little flow, through it at low temperature and high viscosity of the fluid. All flow must pass through orifice entrance 32, metering cylinder passage 28 and limiting orifice 36. As the temperature increases and the viscosity decreases flow begins through the first capillary 22 creating a fluid pressure in spring chamber 21. This pressure tends to move piston 18 up thus closing orifice entrance 32 and restricting the flow of fluid through said entrance orifice, metering passage 28 and limiting orifice 36. Since the pressure on $A_1$ is constant and the pressure on $A_2$ is changing with the viscosity of the fluid due to the flow of fluid through capillary 22 the pressure on $A_2$ plus the force of spring 20 tends to move the piston up closing orifice entrance 32. Since the spring 20 exerts a constant pressure on the piston 18, the amount of flow is determined by the flow through capillary 22 which is dependent on the viscosity of the fluid. The orifice 32 is designed to pass the desired flow minus the flow through the capillary 22 and capillary 26 out through exit port 15. The spring stop and orifice adjustment plug 34, threaded into the metering cylinder 17, serves to adjust the spring tension as well as metering orifice 32.

Thus a simple, straightforward device for limiting the flow of a fluid of changing viscosity has been provided. It has only one moving part, the piston, unless movement of the spring in compression and decompression is considered a moving part. It may be constructed entirely of metal to withstand the high pressures encountered in airplane hydraulic systems and high temperatures. It is tolerant of vibration encountered in airplanes and in fact its action is helped by such vibration.

It is to be understood that the above described arrangement is merely illustrative of the applications of the principles of the invention. Numerous other arrangements may be devised by those skilled in the art without departing from the spirit and scope of the invention.

What I claim is:
1. A valve for limiting a flow of a fluid in a hydraulic system having a constant pressure comprising,
    a housing having a passageway therethrough, one end of said passageway being designated as an inlet port, the other end being designated as an exit port,
    means in said passageway adjacent said inlet port forming a cylinder,
    a piston adapted for movement in said cylinder, said means including
    a chamber behind said cylinder,
    spring means within said chamber for biasing said piston toward said inlet port,
    said housing and cylinder forming means defining an annular passageway having openings connecting said cylinder and inlet with said exit port, the opening in said cylinder forming a metering orifice controlled by the position of said piston, and capillary means connecting said inlet and said chamber for introducing a pressure aiding the force of said biasing spring to cause a closing of said metering orifice by said piston when the viscosity of the fluid decreases a predetermined amount.

2. A valve for providing a predetermined, constant flow of a fluid in a hydraulic system having a constant pressure regardless of the viscosity of the fluid comprising, a housing having a passageway therethrough, one end of said passageway being designated as an inlet port, the other end being designated as an exit port, means in said passageway adjacent said inlet port forming a cylinder, a piston adapted for movement in said cylinder, said means including a chamber behind said cylinder, spring means within said chamber for biasing said piston toward said inlet port, said housing and cylinder forming means defining an annular passageway having openings connecting said cylinder with said exit port, the opening in said cylinder forming a metering orifice controlled by the position of said piston, capillary means in said chamber for connection of said chamber with the exit port portion of said passageway, and capillary means through said piston of a diameter to prevent flow of fluid therethrough under extreme, high viscosity conditions and to permit a flow of fluid as viscosity conditions decrease in order to augment the pressure in said chamber to aid said spring in biasing said piston to close said metering orifice.

References Cited in the file of this patent
UNITED STATES PATENTS

| | | |
|---|---|---|
| 2,164,669 | Thomas | July 4, 1939 |
| 2,225,880 | Montelius | Dec. 24, 1940 |
| 2,243,011 | L'Orange | May 20, 1941 |
| 2,317,743 | Duckstein | Apr. 27, 1943 |
| 2,966,170 | Raulins | Dec. 27, 1960 |